(12) United States Patent
Chen et al.

(10) Patent No.: US 7,541,311 B2
(45) Date of Patent: Jun. 2, 2009

(54) VERMICULITE SUPPORTED CATALYST FOR CO PREFERENTIAL OXIDATION AND THE PROCESS OF PREPARING THE SAME

(75) Inventors: Chao-Yuh Chen, Taoyuan County (TW); Ching-Tsuen Huang, Taoyuan County (TW); Chi-Hung Liao, Taoyuan County (TW); Ching-Tu Chang, Taoyuan County (TW)

(73) Assignee: Institute of Nuclear Energy Research, Taoyuan (TW)

( * ) Notice: Subject to any disclaimer, the term of this patent is extended or adjusted under 35 U.S.C. 154(b) by 159 days.

(21) Appl. No.: 11/848,255

(22) Filed: Aug. 31, 2007

(65) Prior Publication Data

US 2009/0062116 A1    Mar. 5, 2009

(51) Int. Cl.
| | |
|---|---|
| *B01J 21/00* | (2006.01) |
| *B01J 23/02* | (2006.01) |
| *B01J 23/10* | (2006.01) |
| *B01J 23/14* | (2006.01) |
| *B01J 23/34* | (2006.01) |
| *B01J 23/40* | (2006.01) |
| *B01J 23/48* | (2006.01) |
| *B01J 23/54* | (2006.01) |
| *B01J 23/56* | (2006.01) |
| *B01J 23/70* | (2006.01) |
| *B01J 23/72* | (2006.01) |
| *B01J 23/74* | (2006.01) |
| *B01J 23/745* | (2006.01) |
| *B01J 23/75* | (2006.01) |
| *B01J 23/755* | (2006.01) |
| *B01J 23/76* | (2006.01) |

(52) U.S. Cl. .................. 502/345; 502/302; 502/303; 502/304; 502/324; 502/325; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/346; 502/347; 502/348; 502/349; 502/350; 502/351; 502/352; 502/355

(58) Field of Classification Search ......... 502/302–304, 502/325–352, 355
See application file for complete search history.

(56) References Cited

U.S. PATENT DOCUMENTS

| | | | | |
|---|---|---|---|---|
| 3,865,923 | A * | 2/1975 | Stephens | 423/213.2 |
| 4,786,484 | A * | 11/1988 | Nelson | 423/239.1 |
| 5,958,830 | A * | 9/1999 | Khare et al. | 502/407 |
| 2005/0022450 | A1* | 2/2005 | Tan et al. | 48/198.3 |
| 2006/0216227 | A1* | 9/2006 | Idem et al. | 423/651 |

* cited by examiner

*Primary Examiner*—Timothy C Vanoy
*Assistant Examiner*—Serena L Hanor

(57) ABSTRACT

A vermiculite supported catalyst for carbon monoxide (CO) preferential oxidation (PROX) is disclosed. The CO PROX catalyst comprises at least one catalytic agent, one optional modifier agent, one carrier material, and a vermiculite support. The process for preparing the vermiculite supported catalyst in this invention includes depositing first the carrier material on a vermiculite support followed by calcination to form the carrier-containing support, and wet impregnating the catalytic agent and the optional modifier agent on the carrier-containing support followed by drying and calcination to form the CO preferential oxidation catalyst.

21 Claims, No Drawings

US 7,541,311 B2

VERMICULITE SUPPORTED CATALYST FOR CO PREFERENTIAL OXIDATION AND THE PROCESS OF PREPARING THE SAME

BACKGROUND OF THE INVENTION

1. Field of the Invention

The present disclosure relates to a catalyst support useful for preparing a catalyst that serves to oxidize carbon monoxide (CO), particularly, the catalyst useful for oxidizing carbon monoxide preferentially in hydrogen-rich gas produced by the reformer, which is required by proton exchange membrane fuel cell (PEMFC).

2. Description of Related Art

Catalysts for oxidizing CO are well known in the prior art. Such catalysts have utility in a number of fields including the treatment of exhaust gas streams from internal combustion engines, such as automobiles and motorcycles, and the treatment of hydrogen-rich gas produced from the reformer required by PEMFC. Among those catalysts, a so-called "PROX" (preferential oxidation) catalyst is created specifically for the oxidization of CO in hydrogen-rich gas owing to its selective removal of CO.

In a fuel cell, hydrogen is often used as the fuel and supplied to the fuel cell's anode. Oxygen, on the other hand, is the cell's oxidant and is supplied to the cell's cathode. The hydrogen used in the fuel cell usually can be derived from the reforming of methanol, alcohol, methane, liquid petroleum gas (LPG), or other organics. For example, in the methanol reformation process, methanol and water are reacted to generate hydrogen and carbon dioxide according to the reaction: $CH_3OH+H_2O \rightarrow CO_2+3H_2$. Unfortunately, the effluent exiting the reformer contains undesirably high concentration of CO which can quickly damage the fuel cell's anode, and accordingly must be removed.

It is known that CO level in the hydrogen-rich gas exiting a reformer can be reduced by performing a so-called "water-gas shift" (WGS) reaction. In the WGS reactor, water is added into the effluent of the reformer (in the presence of a suitable catalyst) to lower its temperature, and at the same time, increase the steam to carbon ratio therein. The higher steam to carbon ratio serves to lower the CO content in the effluent according to the reaction: $CO+H_2O \rightarrow CO_2+H_2$. Nevertheless, the WGS reaction is still not sufficient to reduce the CO content in the effluent to an acceptable level (below ~30 ppm). Therefore, it is necessary to further remove the CO content in the effluent exiting the WGS reactor before reaching the fuel cell.

It is known that PROX reaction in a suitable PROX reactor can further reduce the CO content in the effluent exiting the WGS reactor according to the reaction: $CO+½O_2 \rightarrow CO_2$. The PROX reactor comprises a PROX catalyst operated at temperature which promotes the preferential oxidation of CO by air in the presence of hydrogen, but without consuming substantial quantities of hydrogen.

Typically, prior art catalysts comprise a precious metal component such as platinum, palladium, rhodium, copper, etc., deposited on a metal oxide support such as alumina, silica, titania, zeolite or the combinations comprising the foregoing. Although precious metal component of the catalyst is crucial in determining its effectiveness, catalyst support material also plays a major role in affecting its performance as well as its application. Its surface properties, such as the specific surface area, the surface acidity, thermal stability, the average pore size and the pore size distribution, etc., have decisive influence on the performance of the catalysts.

U.S. Pat. No. 4,134,860 relates to the manufacture of catalyst. The catalyst composition can contain platinum group metals, base metals, rare earth metals and refractory, such as alumina support.

While alumina is the typical choice of catalyst support owning to its high temperature stability, one of its deficiencies is that it is vulnerable to sulfur-poisoning in the exhaust gas stream. That is, the alumina reacts with oxides of sulfur like $SO_2$ and $SO_3$ to form a sulfate $Al_2(SO_4)_3$ which is stable at high temperature. Formation of alumina sulfate results in a decrease in the surface area and pore size of the alumina. Hence, lowering the efficiency of the catalyst since less catalyst is exposed to the exhaust gases. It is known that titania is resistant to $SO_x$ poisoning at the high operating temperature in the automotive exhaust gas system. U.S. Pat. No. 5,922,294 discloses a catalyst support containing titania which can be used in making the catalyst for treating vehicular exhaust gases.

Another approach to improve the performance of the alumina support is to introduce silica into the alumina support. U.S. Pat. No. 4,134,856 discloses a process for preparing alumina support containing silica by co-precipitation.

U.S. Pat. No. 6,235,255 relates to a platinum metal catalyst dispersed on a catalyst support comprising zeolite. The catalyst made from such support is used for the treatment of exhaust gases, such as carbon monoxide, from "lean-burn" engines.

U.S. Pat. No. 6,780,805 discloses a zeolite/alumina composite catalyst support which exhibit high surface area. The metal catalyst platinum/rhodium deposited on the composite support is used for the conversion of vehicular exhaust gases including carbon monoxide.

A CO preferential oxidation catalyst comprising CuO deposited on $Ce_xZr_{1-x}O_2$ carrier has been demonstrated to show excellent CO removal efficiency as well as good CO selectivity (Chen et al., International Journal of Hydrogen Energy, 2006, 31, 427-435). However, the application of such catalyst is limited by its powder form.

Up to now, various catalyst support materials have been utilized in making an effective catalyst for the treatment of exhaust gases, particularly carbon monoxide, produced by the internal combustion engines or the reforming reaction to generate hydrogen-rich gas for PEMFC. However, for both practical and commercial applications, the effectiveness of the catalyst in treating the gases is not the only concern. Besides good performance, it is also essential to come up with a supported catalyst that is low-cost, durable, easy to handle (inert), and widely applicable.

SUMMARY OF THE INVENTION

The present invention relates to a catalyst support material useful for preparing the catalyst for oxidizing carbon monoxide preferentially. The process for preparing such supported catalyst in this invention includes depositing first the carrier material on the support followed by calcination to form the carrier-containing support, and then wet impregnating the catalytic agent and the optional modifier agent on the carrier-containing support followed by drying and calcination to form the supported catalyst. The supported catalyst in the present invention has the advantages of high efficiency, high thermal durability, high absorptivity, low-cost, easy-to-handle (inert), and widely applicable.

It is therefore an object of this invention to provide a catalyst support for a catalyst that will catalyze the oxidation of carbon monoxide preferentially with high efficiency and high thermal durability.

It is therefore another object of this invention to provide a catalyst support for a carbon monoxide preferential oxidation catalyst that will increase its uptake for catalyst material(s) as well as maximize its exposure to the treating gases.

It is therefore another object of this invention to provide a catalyst support in making a carbon monoxide preferential oxidation catalyst that is low-cost, easy to handle (inert) as well as widely applicable.

It is well known that vermiculite (a hydrated magnesium aluminum silicate) is one of the safest, most unique minerals in the entire world. It is natural, lightweight, inorganic (incombustible), compressible, highly absorbent, non-reactive, low-cost, and is available locally and globally. As the result, the objects of this invention can be achieved by utilizing vermiculite as the catalyst support material.

DETAILED DESCRIPTION OF THE PREFERRED EMBODIMENTS

The CO preferential oxidation catalyst of this invention comprises a catalytic agent, an optional modifier agent, a carrier material, and a vermiculite support. The catalytic agent may include metals, such as platinum (Pt), palladium (Pd), rhodium (Rh), iridium (Ir), osmium (Os), ruthenium (Ru), tantalum (Ta), zirconium (Zr), yttrium (Y), cerium (Ce), nickel (Ni), copper (Cu), silver (Ag), gold (Au), zinc (Zn) and the like, as well as oxides, compounds, alloys, and combinations comprising at least one of the foregoing catalytic agents, wherein catalytic agent comprising Pt, Rh, Pd, Ir, Au, Ag, or Cu is particularly preferred.

The optional modifier agent is any material capable of enhancing the performance of a catalyst by promoting carbon monoxide adsorption on the catalyst. Preferable modifier agents may include cobalt (Co), Manganese (Mn), lanthanum (La), platinum (Pt), ruthenium (Ru), potassium (K), magnesium (Mg) and the like, as well as oxides, compounds, alloys, and combinations comprising at least one of the foregoing materials, wherein modifier agent comprising Co or Mn is particularly preferred.

The carrier material is any material capable of enhancing the performance of a catalyst by promoting the oxygen exchange capacity. The oxygen from the carrier material oxidizes the CO adsorbed on the catalytic agent at the interface, and the oxygen vacancy in the carrier material is then replenished by the oxygen from the air (Chen et al., International Journal of Hydrogen Energy, 2006, 31, 427-435). Preferable carrier materials may include zirconium (Zr), lanthanum (La), cerium (Ce), nickel (Ni), copper (Cu), iron (Fe), titanium (Ti), tin (Sn) and the like, as well as oxides, compounds, alloys, and combinations comprising at least one of the foregoing materials, wherein carrier material comprising Ce and Zr is particularly preferred.

The ratio of modifier agent to catalytic agent may vary. A preferred ratio is about 1:10 to about 1:60 parts of modifier agent to catalytic agent, where about 1:30 to about 1:50 parts of modifier agent to catalytic agent is more preferred.

Similarly, the ratio of carrier material to catalytic agent may vary. A preferred ratio is about 1:1 to about 4:1 parts of carrier material to catalytic agent, where about 1.5:1 to about 4:1 parts of carrier material to catalytic agent is more preferred.

The carrier material, catalytic agent, and optional modifier agent are on a support material. The support material in this invention is vermiculite. Ideally, the catalytic agent, optional modifier agent, and the carrier material can be deposited onto the support by vapor deposition, sputtering, absorption, etc., to form a supported catalyst, in which the process can be sequential or simultaneous. However, deposition of the carrier material first onto the support followed by the catalytic agent and the optional modifier agent is preferred in this invention.

The carrier material is preferably introduced to the support in the form of a carrier material solution, wherein the carrier material solution can comprise a nitrate, sulfide, chloride, organic salt, and combinations comprise at least one of the foregoing in the solution. An exemplary carrier material solution comprises both cerium nitrate and zirconium nitrate in water solution.

Similar to the carrier material, the optional modifier agent is preferably introduced in the form of a modifier agent solution, wherein the modifier agent solution can comprise a nitrate, sulfide, chloride, organic salt, and combinations comprising at least one of the foregoing in the solution. An exemplary modifier agent solution comprises cobalt nitrate in water solution.

Similar to the carrier material, the catalytic agent is preferably introduced in the form of a catalytic agent solution, wherein the catalytic agent solution can comprise a nitrate, sulfide, chloride, organic salt, and combinations comprising at least one of the foregoing in the solution. An exemplary catalytic agent solution comprises copper nitrate in water solution.

EXAMPLE 1

Vermiculite-Supported Catalyst with 50 wt. % $Cu(NO_3)_2 \cdot 3H_2O$

The vermiculite-supported catalyst was prepared by the following procedures. Step (1): 0.611 g of $ZrO(NO_3)_2 \cdot 8H_2O$ was combined with an appropriate amount of RO water in a beaker and the mixture was dissolved by ultrasonication for around 10 minutes. Step (2): 5.8423 g of $Ce(NO_3)_3 \cdot 6H_2O$ and appropriate amount of RO water were then mixed with the Zr-containing solution just prepared to form the carrier material solution, which weighed 11.68 g in total (Ce/Zr molar ratio of the carrier material solution is 0.9/0.1). The Ce/Zr carrier material solution then underwent ultrasonication for about 10 minutes to ensure complete dissolution. Step (3): The Ce/Zr carrier material was precipitated onto the vermiculite support by first adding 1.536 g of vermiculite into the prepared Ce/Zr carrier material solution. The resulting mixture was adjusted with appropriate amount of ammonia to give a final pH of about 10~11 and allowed to age for 4 hours. Step (4): The solid mixture with precipitation obtained in Step (3) were then separated from the liquid by filtration and washed with RO water. Step (5): The carrier-containing support was then completed after calcining the resulting product (Step 4) in ambient air at 650° C. for 4 hours with a temperature elevation rate of 5° C./min. Step (6): The catalytic agent was deposited onto the carrier-containing support by wet impregnation method with 50 wt. % $Cu(NO_3)_2 \cdot 3H_2O$ solution. Step (7): After wet impregnation, the resulting support was dried in an oven at 105° C. for 2 hours. The final vermiculite-supported catalyst was completed after calcining the resulting product (Step 6) in ambient air at 650° C. for 4 hours with a temperature elevation rate of 5° C./min.

The performance of catalyst in oxidizing CO preferentially was determined by the procedures described below. The catalyst was contained inside a U-shaped quartz reaction tube with 4 mm in diameter and fixed in position by filling quartz wool at both ends. The reaction tube was situated inside a furnace for reaction temperature control. The feeding gases were passed through the tube and the flow rate was controlled by a mass flow controller (MFC). After reacting with the catalyst, the gas was then guided out of the system. The flow rate of the outlet gas was determined by a bubble flow meter and the concentration of the outlet gas was measured by a micro-GC (from Agilent Technologies). The conditions for catalytic performance measurement are as follows: 0.27 g of the vermiculite-supported catalyst is used; the feed gas is composed of 1.99% CO, 1.74% $O_2$, 15% $CO_2$, and 48% $H_2$ in $N_2$; and the feed rate is 75.85 cc/min to give F/W of 29.16 L/g-h.

The following definitions (equations) explain the meaning of some measuring terms that often are applied in evaluating the performance of catalyst. The overall performance of the vermiculite-supported catalyst is summarized in Table 1.

Definition:

$$\text{CO conversion (\%)} = \frac{\text{mole of CO in the feed} - \text{mole of CO in the procuct}}{\text{mole of CO in the feed}} \times 100\%$$

$$\text{CO selection (\%)} = \frac{\text{mole of } O_2 \text{ which reacts with CO}}{\text{mole of } O_2 \text{ which reacts with CO} + \text{mole of } O_2 \text{ which reacts with } H_2} \times 100\%$$

$$\frac{F}{W}\text{(L/g-h)} = \frac{\text{Feed flow rate (L/h)}}{\text{The weight of catalyst, modifier, and carrier (g)}}$$

TABLE 1

The performance of vermiculite-supported catalyst with 50 wt. % $Cu(NO_3)_2 \cdot 3H_2O$ solution

| Reaction temperature (° C.) | CO concentration in the feed end (ppm) | CO concentration in the product end (ppm) | CO conversion (%) | CO selectivity (%) |
|---|---|---|---|---|
| 180 | 19900 | 7.3 | 99.96 | 74.82 |
| 160 | 19900 | 241 | 98.78 | 100 |
| 140 | 19900 | 6932 | 64.91 | 100 |

EXAMPLE 2

Vermiculite-Supported Catalyst with 60 wt. % $Cu(NO_3)_2 \cdot 3H_2O$

A vermiculite-supported catalyst of the present invention was prepared by the procedures similar to that in Example 1 except that in Step (6), the carrier-containing vermiculite support prepared (Step 5) was wet impregnated with 60 wt. % $Cu(NO_3)_2 \cdot 3H_2O$.

The measuring procedures for determining the vermiculite-supported catalyst performance is the same as that in Example 1 except that some experimental parameters, such as feed rate, and feed composition were varied due to control limitation. The feed gas is composed of 2.02% CO, 1.74% $O_2$, 15% $CO_2$, and 48% $H_2$ in $N_2$, and the feed rate is 72.55 cc/min to give F/W of 27.89 L/g-h. The overall performance of the vermiculite-supported catalyst is summarized in Table 2.

TABLE 2

The overall performance of vermiculite-supported catalyst with 60 wt. % $Cu(NO_3)_2 \cdot 3H_2O$ solution

| Reaction temperature (° C.) | CO concentration in the feed end (ppm) | CO concentration in the product end (ppm) | CO conversion (%) | CO selectivity (%) |
|---|---|---|---|---|
| 180 | 20200 | 108 | 99.47 | 92 |
| 160 | 20200 | 1369 | 93.26 | 100 |
| 140 | 20200 | 7848 | 61.15 | 100 |

EXAMPLE 3

Vermiculite-Supported Catalyst with 25 wt. % $Cu(NO_3)_2 \cdot 3H_2O$

A vermiculite-supported catalyst of the present invention was prepared by the procedures similar to that in Example 1 except that in Step (6), the carrier-containing vermiculite support prepared (Step 5) was wet impregnated with 25 wt. % $Cu(NO_3)_2 \cdot 3H_2O$.

The measuring procedures for determining the vermiculite-supported catalyst performance is the same as that in Example 1 except that some experimental parameters, such as feed rate, and feed composition were varied due to control limitation. The feed gas is composed of 2.01% CO, 1.73% $O_2$, 15% $CO_2$, and 48% $H_2$ in $N_2$, and the feed rate is 72.55 cc/min to give F/W of 27.89 L/g-h. The overall performance of the vermiculite-supported catalyst is summarized in Table 3.

TABLE 3

The overall performance of vermiculite-supported catalyst with 25 wt. % $Cu(NO_3)_2 \cdot 3H_2O$ solution

| Reaction temperature (° C.) | CO concentration in the feed end (ppm) | CO concentration in the product end (ppm) | CO conversion (%) | CO selectivity (%) |
|---|---|---|---|---|
| 180 | 20100 | 17 | 99.91 | 79.24 |
| 160 | 20100 | 615 | 96.95 | 100 |
| 140 | 20100 | 8792 | 56.35 | 100 |

It is noted that the concentration of $Cu(NO_3)_2 \cdot 3H_2O$ solution has an minor impact on the catalyst performance. Among various $Cu(NO_3)_2 \cdot 3H_2O$ concentrations (Table 1, 2, and 3) tested, the catalyst with 50 wt. % $Cu(NO_3)_2 \cdot 3H_2O$ (Example 1) has shown the best performance regardless of the reaction temperature. At the temperature of 180° C., it demonstrates an excellent CO conversion rate of 99.96% with a CO selectivity of 74.82%.

EXAMPLE 4

Vermiculite-Supported Catalyst with Ce/Zr Molar Ratio of 0.8:0.2

A vermiculite-supported catalyst of the present invention was prepared by the procedures similar to that in Example 1 except that 1.146 g of $ZrO(NO_3)_2 \cdot 8H_2O$ and 5.307 g of $Ce(NO_3)_3 \cdot 6H_2O$ in Step (1) and (2), respectively, was added with an appropriate amount of RO water to give a total solution weight of 11.68 g (Ce/Zr molar ratio of the carrier material solution is 0.8/0.2).

The measuring procedures for determining the vermiculite-supported catalyst performance is the same as that in Example 1 except that experimental parameter such as feed composition was varied. The feed gas is composed of 2.01% CO, 1.75% $O_2$, 15% $CO_2$, and 48% $H_2$ in $N_2$. The overall performance of the vermiculite-supported catalyst is summarized in Table 4.

TABLE 4

The performance of vermiculite-supported catalyst with Ce/Zr molar ratio of 0.8/0.2

| Reaction temperature (° C.) | CO concentration in the feed end (ppm) | CO concentration in the product end (ppm) | CO conversion (%) | CO selectivity (%) |
|---|---|---|---|---|
| 180 | 20100 | 175 | 99.15 | 93.19 |
| 160 | 20100 | 2743 | 86.47 | 100 |
| 140 | 20100 | 9739 | 51.43 | 100 |

EXAMPLE 5

Vermiculite-Supported Catalyst with Ce/Zr Molar Ratio of 0.7:0.3

A vermiculite-supported catalyst of the present invention was prepared by the procedures similar to that in Example 1 except that 1.744 g of $ZrO(NO_3)_2.8H_2O$ and 4.709 g of $Ce(NO_3)_3.6H_2O$ in Step (1) and (2), respectively, was added with an appropriate amount of RO water to give a total solution weight of 11.68 g (Ce/Zr molar ratio of the carrier material solution is 0.7/0.3).

The measuring procedures for determining the vermiculite-supported catalyst performance is the same as that in Example 1. The overall performance of the vermiculite-supported catalyst is summarized in Table 5.

TABLE 5

The performance of vermiculite-supported catalyst with Ce/Zr molar ratio of 0.7/0.3

| Reaction temperature (° C.) | CO concentration in the feed end (ppm) | CO concentration in the product end (ppm) | CO conversion (%) | CO selectivity (%) |
|---|---|---|---|---|
| 180 | 19900 | 155 | 99.25 | 95.25 |
| 160 | 19900 | 2305 | 88.65 | 100 |
| 140 | 19900 | 14205 | 29.16 | 100 |

EXAMPLE 6

Vermiculite-Supported Catalyst with Ce/Zr Molar Ratio of 0.5:0.5

A vermiculite-supported catalyst of the present invention was prepared by the procedures similar to that in Example 1 except that 2.991 g of $ZrO(NO_3)_2.8H_2O$ and 3.462 g of $Ce(NO_3)_3.6H_2O$ in Step (1) and (2), respectively, was added with an appropriate amount of RO water to give a total solution weight of 11.68 g (Ce/Zr molar ratio of the carrier material solution is 0.5/0.5).

The measuring procedures for determining the vermiculite-supported catalyst performance is the same as that in Example 1. The overall performance of the vermiculite-supported catalyst is summarized in Table 6.

TABLE 6

The performance of vermiculite-supported catalyst with Ce/Zr molar ratio of 0.5/0.5

| Reaction temperature (° C.) | CO concentration in the feed end (ppm) | CO concentration in the product end (ppm) | CO conversion (%) | CO selectivity (%) |
|---|---|---|---|---|
| 180 | 19900 | 10260 | 48.79 | 100 |
| 160 | 19900 | 15698 | 20.03 | 100 |
| 140 | 19900 | 18455 | 6.35 | 100 |

Besides catalytic solution concentration, the ratio of Ce/Zr in the carrier solution in this invention also has significant influence on the catalyst performance. Comparing the overall performance of the catalyst with different Ce/Zr molar ratio (Table 1, 4, 5, and 6), it is apparent that the catalyst with Ce/Zr molar ratio of 0.9/0.1 (Example 1) has shown the best performance regardless of the reaction temperature. At the temperature of 180° C., it reaches the highest CO conversion rate of 99.96% with a CO selectivity of 74.82%.

EXAMPLE 7

Vermiculite-Supported Catalyst

A vermiculite-supported catalyst of the present invention was prepared by the procedures in Example 1.

The measuring procedures for determining the vermiculite-supported catalyst performance is the same as that in Example 1 except that some experimental parameters, such as catalyst weight, feed rate, and feed composition were varied. The conditions for catalytic performance measurement are as follows: 0.5007 g of the vermiculite-supported catalyst is used; the feed gas is composed of 2.04% CO, 1.63% $O_2$, 15% $CO_2$, and 48% $H_2$ in $N_2$; and the feed rate is 108.5 cc/min to give F/W of 22.5 L/g-h. The calculated reactor volume is 1.66 cc. The overall performance of the vermiculite-supported catalyst is summarized in Table 7.

TABLE 7

The overall performance of vermiculite-supported catalyst

| Reaction temperature (° C.) | CO concentration in the feed end (ppm) | CO concentration in the product end (ppm) | CO conversion (%) | CO selectivity (%) |
|---|---|---|---|---|
| 180 | 20400 | 93 | 99.56 | 93.66 |
| 160 | 20400 | 1152 | 94.47 | 100 |
| 140 | 20400 | 6547 | 68.54 | 100 |

Comparative Example 8

Alumina-Supported Catalyst

An alumina-supported catalyst was prepared by the procedures similar to that in Example 1 except that in Step (3), 14.6 g of gamma alumina was used as the support material.

The measuring procedures for determining the alumina-supported catalyst performance is the same as that in Example 1 except that some experimental parameters, such as catalyst weight, feed rate, and feed composition were varied. The conditions for catalytic performance measurement are as follows: 1.9804 g of the alumina-supported catalyst is used; the feed gas is composed of 2.11% CO, 1.86% $O_2$, 15% $CO_2$, and 48% $H_2$ in $N_2$; and the feed rate is 99.83 cc/min to give F/W of 17.51 L/g-h. The calculated reactor volume is 2.85 cc. The overall performance of the alumina-supported catalyst is summarized in Table 8.

TABLE 8

The overall performance of gamma alumina-supported catalyst

| Reaction temperature (° C.) | CO concentration in the feed end (ppm) | CO concentration in the product end (ppm) | CO conversion (%) | CO selectivity (%) |
|---|---|---|---|---|
| 180 | 21100 | 7721 | 64.64 | 42.76 |
| 160 | 21100 | 4772 | 77.97 | 51.09 |
| 145 | 21100 | 486 | 97.72 | 69.26 |
| 140 | 21100 | 1339 | 93.73 | 61.46 |

Comparative Example 9

5A-Zeolite-Supported Catalyst

A 5A-zeolite-supported catalyst was prepared by the procedures similar to that in Example 1 except that in Step (3), 14.6 g of 5A-zeolite was used as the support material.

The measuring procedures for determining the 5A-zeolite-supported catalyst performance is the same as that in Example 1 except that some experimental parameters, such as catalyst weight, feed rate, and feed composition were varied. The conditions for catalytic performance measurement are as follows: 2.1485 g of the 5A-zeolite-supported catalyst is used; the feed gas is composed of 2.08% CO, 1.81% $O_2$, 15% $CO_2$, and 48% $H_2$ in $N_2$; and the feed rate is 100.5 cc/min to give F/W of 20.8 L/g-h. The calculated reactor volume is 2.72 cc. The overall performance of the 5A-zeolite-supported catalyst is summarized in Table 9.

TABLE 9

The overall performance of 5A-zeolite-supported catalyst

| Reaction temperature (° C.) | CO concentration in the feed end (ppm) | CO concentration in the product end (ppm) | CO conversion (%) | CO selectivity (%) |
|---|---|---|---|---|
| 210 | 20800 | 20540 | 2.96 | 9.34 |
| 200 | 20800 | 20685 | 1.30 | 11.00 |
| 190 | 20800 | 20701 | 0.89 | 5.67 |

Table 7~9 illustrate the overall performances of catalysts having equivalent amount of catalytic agent/carrier material (0.29 g in total) yet loaded on different support materials. From the results (Table 7, 8, and 9), it is obvious that the catalyst with vermiculite as the support material (Example 7) has shown the best performance. For instance, the optimal performance of vermiculite-supported catalyst is found at 180° C., which demonstrates an outstanding CO conversion rate of 99.56% while maintaining relatively high CO selectivity of 93.66%. On the other hand, the optimal performance of gamma-type alumina-supported catalyst and 5A-zeolite-supported catalyst is found at 145° C. and 210° C., respectively. The corresponding CO conversion rate for gamma-type alumina-supported catalyst and 5A-zeolite-supported catalyst is 97.72% and 2.96%, respectively.

TABLE 10

The proportion of metal in different support catalyst

| | Cu wt. % | Ce wt. % | Zr wt. % |
|---|---|---|---|
| vermiculite-supported catalyst | 25.64 | 30.86 | 2.38 |
| gamma alumina-supported catalyst | 9.93 | 6.84 | 0.5 |
| 5A-zeolite-supported catalyst | 7.06 | 6.71 | 0.73 |

*ICP-AES results.

The proportion of copper, cerium, and zirconium in different supported catalyst is shown in Table 10. The alumina-supported catalyst, 5A-zeolite-supported catalyst, and vermiculite-supported catalyst were prepared by the procedures described in Comparative Example 8~9, and Example 7, respectively. It is obvious that the amount of copper, cerium, and zirconium in vermiculite-supported catalyst is greater than those in alumina-supported catalyst or 5A-zeolite-supported catalyst, which demonstrates the excellent absorptivity of vermiculite support.

TABLE 11

The reactor volume and cost of various supported catalysts with catalyst/carrier loading of 0.29 g

| | Reactor volume (cm³) | Cost ($) |
|---|---|---|
| vermiculite-supported catalyst | 1.66 | 0.20 |
| gamma alumina-supported catalyst | 2.85 | 0.39 |
| 5A-zeolite-supported catalyst | 2.72 | 1.53 |

Table 11 illustrates the reactor volume and cost of various supported catalysts with the same catalyst/carrier loading. It is noticed that the reactor volume of vermiculite-supported catalyst is less than that of alumina-supported catalyst or 5A-zeolite-supported catalyst. Furthermore, the cost of vermiculite-supported catalyst is also the lowest among other supported catalysts.

EXAMPLE 10

Vermiculite-Supported Catalyst with 1.31 wt. % $Co(NO_3)_2.6H_2O$ as the Modifier A vermiculite-supported catalyst of the present invention was prepared by the procedures similar to that in Example 1 except that in Step (6), the carrier-containing vermiculite support prepared (Step 5) was wet impregnated with the mixing solution of 50 wt. % $Cu(NO_3)_2.3H_2O$ and 1.31 wt. % $Co(NO_3)_2.6H_2O$.

The measuring procedures for determining the vermiculite-supported catalyst performance is the same as that in Example 1 except the amount of catalyst used, which is 0.5 g. Minor variations in other experimental parameters, such as feed rate, and feed composition were also noticed due to control limitation. The feed gas is composed of 2.05% CO, 1.61% $O_2$, 15% $CO_2$, and 48% $H_2$ in $N_2$; and the feed rate is 103.45 cc/min to give F/W of 21.48 L/g-h. The overall performance of the vermiculite-supported catalyst is summarized in Table 12.

TABLE 12

The performance of vermiculite-supported catalyst with 1.31 wt. %
Co(NO$_3$)$_2$•6H$_2$O added as the modifier agent solution

| Reaction temperature (° C.) | CO concentration in the feed end (ppm) | CO concentration in the product end (ppm) | CO conversion (%) | CO selectivity (%) |
|---|---|---|---|---|
| 180 | 20500 | 6 | 99.97 | 73.66 |
| 160 | 20500 | 101 | 99.51 | 94.99 |
| 140 | 20500 | 1669 | 92.02 | 100 |

EXAMPLE 11

Vermiculite-Supported Catalyst with 1.28 wt. % Mn(NO$_3$)$_2$.4H$_2$O as the Modifier A vermiculite-supported catalyst of the present invention was prepared by the procedures similar to that in Example 1 except that in Step (6), the carrier-containing vermiculite support prepared (Step 5) was wet impregnated with the mixing solution of 50 wt. % Cu(NO$_3$)$_2$.3H$_2$O and 1.28 wt. % Mn(NO$_3$)$_2$.4H$_2$O.

The measuring procedures for determining the vermiculite-supported catalyst performance is the same as that in Example 1 except the amount of catalyst used, which is 0.5 g. Minor variations in other experimental parameters, such as feed rate, and feed composition were also noticed due to control limitation. The feed gas is composed of 2.03% CO, 1.61% O$_2$, 15% CO$_2$, and 48% H$_2$ in N$_2$; and the feed rate is 103.63 cc/min to give F/W of 21.51 L/g-h. The overall performance of the vermiculite-supported catalyst is summarized in Table 13.

TABLE 13

The performance of vermiculite-supported catalyst with 1.28 wt. %
Mn(NO$_3$)$_2$•4H$_2$O added as the modifier agent solution

| Reaction temperature (° C.) | CO concentration in the feed end (ppm) | CO concentration in the product end (ppm) | CO conversion (%) | CO selectivity (%) |
|---|---|---|---|---|
| 180 | 20300 | 17 | 99.92 | 76.63 |
| 160 | 20300 | 227 | 98.89 | 100 |
| 140 | 20300 | 2854 | 87.32 | 100 |

Comparing the performance of vermiculite supported catalyst with (Example 10, 11) and without (Example 7) the modifier agent, it is noticed that the performance of the former one is better than that of the later one in terms of CO conversion as well as the selectivity. At the temperature of 180° C., the vermiculite supported catalyst with CoOx as the modifier agent (Example 10) demonstrates an outstanding CO conversion rate of 99.97% with CO selectivity of 73.66%.

What is claimed is:

1. A process for forming a CO preferential oxidation catalyst comprising:
    a carrier material is first deposited on a vermiculite support by precipitation;
    a catalytic agent and optional modifier agent are deposited on a carrier-containing vermiculite support by impregnation;
    precipitation of carrier material on the vermiculite support comprises immersing the vermiculite support in carrier material solution, adjusting the pH of mixture to an appropriate level by adding alkaline solution to allow precipitation;
    filtering out the precipitates with subsequent washing and drying; and
    calcining the final product in ambient air at 650° C. for 4 hours to obtain the carrier-containing vermiculite support.

2. The process for forming a CO preferential oxidation catalyst of claim 1, wherein said carrier material solution is made of Ce and Zr salts.

3. The process for forming a CO preferential oxidation catalyst of claim 2, wherein said Ce salt includes cerium nitrates, cerium sulfides, or cerium chlorides.

4. The process for forming a CO preferential oxidation catalyst of claim 2, wherein said Zr salt includes zirconium nitrates, zirconium sulfides, or zirconium chlorides.

5. The process for forming a CO preferential oxidation catalyst of claim 1, wherein said alkaline solution includes sodium carbonate, sodium bicarbonate, or ammonia.

6. The process for forming a CO preferential oxidation catalyst of claim 1, wherein said impregnation of catalytic agent and optional modifier agent on the carrier-containing vermiculite support comprises immersing the carrier-containing vermiculite support in the catalytic agent solution with optional modifier agent solution, and calcining the final product in ambient air at 650° C. for 4 hours after drying at 105° C.

7. The process for forming a CO preferential oxidation catalyst of claim 6, wherein said catalytic agent solution is made of Cu salt.

8. The process for forming a CO preferential oxidation catalyst of claim 7, wherein said Cu salt includes copper nitrates, copper sulfides, or copper chlorides.

9. The process for forming a CO preferential oxidation catalyst of claim 6, wherein said optional modifier agent solution is made of Co or Mn salt.

10. The process for forming a CO preferential oxidation catalyst of claim 9, wherein said Co salt includes cobalt nitrates, cobalt sulfides, or cobalt chlorides.

11. The process for forming a CO preferential oxidation catalyst of claim 9, wherein said Mn salt includes manganese nitrates, manganese sulfides, or manganese chlorides.

12. A CO preferential oxidation catalyst produced from the process of claim 1 comprising: a catalytic agent, an optional modifier agent, a carrier material, and a vermiculite support.

13. The CO preferential oxidation catalyst of claim 12, wherein said catalytic agent is selected from the group consisting of platinum (Pt), palladium (Pd), rhodium (Rh), iridium (Ir), osmium (Os), ruthenium (Ru), tantalum (Ta), zirconium (Zr), yttrium (Y), cerium (Ce), nickel (Ni), copper (Cu), silver (Ag), gold (Au), and zinc (Zn), as well as oxides, compounds, alloys, and combinations including at least one of the foregoing.

14. The CO preferential oxidation catalyst of claim 13, wherein said catalytic agent is Cu oxide.

15. The CO preferential oxidation catalyst of claim 14, comprising about 10 to 35 wt. % of said catalytic agent, based upon a total weight of said CO preferential oxidation catalyst.

16. The CO preferential oxidation catalyst of claim 12, wherein said optional modifier agent is selected from the group consisting of cobalt (Co), Manganese (Mn), lanthanum (La), platinum (Pt), ruthenium (Ru), potassium (K), and magnesium (Mg), as well as oxides, compounds, alloys, and combinations including at least one of the foregoing.

17. The CO preferential oxidation catalyst of claim 16, wherein said optional modifier agent is Co or Mn oxide.

18. The CO preferential oxidation catalyst of claim 17, comprising about 0.1 to 1.0 wt. % of said modifier agent, based upon a total weight of said CO preferential oxidation catalyst.

19. The CO preferential oxidation catalyst of claim 12, wherein said carrier material is selected from the group consisting of zirconium (Zr), lanthanum (La), cerium (Ce), nickel (Ni), copper (Cu), iron (Fe), titanium (Ti), and tin (Sn), as well as oxides, compounds, alloys, and combinations including at least one of the foregoing. said modifier agent, based upon a total weight of said CO preferential oxidation catalyst.

20. The CO preferential oxidation catalyst of claim 19, wherein said carrier material is a mixture of Ce and Zr oxide.

21. The CO preferential oxidation catalyst of claim 20, further comprising about 25 to 55 wt. % of said carrier material, based upon a total weight of said CO preferential oxidation catalyst.

* * * * *